United States Patent
Takenaka et al.

(10) Patent No.: US 8,973,456 B2
(45) Date of Patent: Mar. 10, 2015

(54) FITTING STRUCTURE

(75) Inventors: Tatsushi Takenaka, Toyota (JP); Akira Nakata, Susono (JP); Akihito Kajiwara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 174 days.

(21) Appl. No.: 13/142,173

(22) PCT Filed: Dec. 26, 2008

(86) PCT No.: PCT/JP2008/073748
§ 371 (c)(1),
(2), (4) Date: Jun. 24, 2011

(87) PCT Pub. No.: WO2010/073376
PCT Pub. Date: Jul. 1, 2010

(65) Prior Publication Data
US 2011/0252907 A1    Oct. 20, 2011

(51) Int. Cl.
*F16H 1/12* (2006.01)
*F16H 57/08* (2006.01)
*F16D 3/12* (2006.01)
*F16D 3/68* (2006.01)
*F16H 57/00* (2012.01)
(Continued)

(52) U.S. Cl.
CPC ............... *F16H 57/082* (2013.01); *F16D 3/12* (2013.01); *F16D 3/68* (2013.01); *F16H 57/0006* (2013.01); *F16H 37/10* (2013.01); *F16H 2057/02034* (2013.01)
USPC ........................................ 74/421 R; 475/276

(58) Field of Classification Search
USPC ........ 74/421 R, 434, 457, 443; 277/345, 350, 277/376, 380; 475/276, 286
See application file for complete search history.

(56) References Cited

U.S. PATENT DOCUMENTS 2,963,913 A * 12/1960 Wensloff .................... 74/15.6
5,080,187 A * 1/1992 Asano et al. ................ 180/248
5,376,057 A * 12/1994 Cooper et al. .............. 475/248
(Continued)

FOREIGN PATENT DOCUMENTS

JP      5 26310     7/1993
JP      6 81908     3/1994
(Continued)

OTHER PUBLICATIONS

International Search Report issued Mar. 10, 2009 in PCT/JP08/73748 filed Dec. 26, 2008.

*Primary Examiner* — David M Fenstermacher
*Assistant Examiner* — Zakaria Elahmadi
(74) *Attorney, Agent, or Firm* — Oblon, McClelland, Maier & Neustadt, L.L.P.

(57) ABSTRACT

A fitting structure includes: a power transmission member circumferentially provided with first and second spaced teeth and receiving power transmitted; and a fitting member surrounding the power transmission member and having a first recess and a second recess receiving the first tooth and the second tooth respectively, to fit to the power transmission member. There is a larger distance between an external surface of the first tooth and an internal surface of the first recess than that between an external surface of the second tooth and an internal surface of the second recess. An elastically deformable buffer member is provided between the external surface of the first tooth and the internal surface of the first recess.

5 Claims, 5 Drawing Sheets

(51) Int. Cl.
*F16H 37/10* (2006.01)
*F16H 57/02* (2012.01)

(56) References Cited

U.S. PATENT DOCUMENTS

| | | | | |
|---|---|---|---|---|
| 5,529,160 | A * | 6/1996 | Tanaka et al. | 192/70.2 |
| 5,546,824 | A * | 8/1996 | Miller et al. | 74/421 R |
| 5,999,789 | A * | 12/1999 | Sawamura | 399/330 |
| 6,035,956 | A * | 3/2000 | Maurer et al. | 180/383 |
| 6,318,200 | B1 * | 11/2001 | Coleman et al. | 74/421 R |
| 6,419,068 | B1 * | 7/2002 | Stephan et al. | 192/219.5 |
| 8,057,352 | B2 * | 11/2011 | Nishiji | 475/344 |
| 2003/0140719 | A1 * | 7/2003 | Johnson et al. | 74/421 R |
| 2012/0061199 | A1 * | 3/2012 | Tsukamoto et al. | 192/3.28 |
| 2012/0132024 | A1 * | 5/2012 | Mittermair et al. | 74/421 R |

FOREIGN PATENT DOCUMENTS

| | | |
|---|---|---|
| JP | 8 166050 | 6/1996 |
| JP | 9 273622 | 10/1997 |
| JP | 2001 182809 | 7/2001 |
| JP | 2006 183824 | 7/2006 |

* cited by examiner

FITTING STRUCTURE

TECHNICAL FIELD

The present invention relates generally to a fitting structure and particularly to a fitting structure including a power transmission member receiving power transmitted and a fitting member fitted to the power transmission member.

BACKGROUND ART

Conventionally, a planetary gear mechanism fitted in a vehicular gear casing has been widely known.

For example, Japanese Patent Laying-open No. 2006-183824 describes a planetary gear mechanism including a sun gear, a pinion gear positioned outer than the sun gear and meshing therewith, and a ring gear positioned outer than the pinion gear and meshing therewith. Each pinion gear is rotatably supported by a planetary carrier fitted in the gear casing.

The planetary carrier has a circumference with a plurality of projections and the gear casing has a plurality of recesses to receive the projections. The planetary carrier has the projections fitted into the recesses of the gear casing and is thus fitted in the gear casing.

Patent Document 1: Japanese Patent Laying-open No. 2006-183824

DISCLOSURE OF THE INVENTION

Problems to be Solved by the Invention

Generally, there is a gap between a planetary carrier's projections and a gear casing's recesses.

As such, when the aforementioned, conventional planetary gear mechanism receives a varying torque from the engine, the projections collide against the recesses' internal surfaces and thus cause an unusual noise.

Furthermore, such an usual noise is not limited to a planetary gear mechanism and a gear casing fitted together; it is also caused similarly in a splined structure that includes a shaft having a circumferential surface with a plurality of teeth and an outer frame fitted to the shaft and transmits the shaft's torque to the outer frame.

The present invention has been made to overcome such a disadvantage as described above and it contemplates a fitting structure which includes a power transmission member receiving power transmitted and a fitting member fitted to the power transmission member and reduces usual noise caused between the power transmission member and the fitting member.

Means for Solving the Problems

The present invention provides a fitting structure including: a power transmission member circumferentially provided with first and second spaced teeth and receiving power transmitted; and a fitting member surrounding the power transmission member and having a first recess and a second recess receiving the first tooth and the second tooth, respectively, to fit to the power transmission member. An elastically deformable buffer member is provided between an external surface of the first tooth and an internal surface of the first recess. There is a larger distance between the external surface of the first tooth and the internal surface of the first recess than that between an external surface of the second tooth and an internal surface of the second recess.

Preferably, the first tooth has the external surface including a first external surface and a second external surface aligned in a widthwise direction of the first tooth. The second tooth has the external surface including a third external surface and a fourth external surface aligned in a widthwise direction of the second tooth. The first recess has the internal surface including a first internal surface and a second internal surface facing the first external surface and the second external surface, respectively. The second recess has the internal surface including a third internal surface and a fourth internal surface facing the third external surface and the fourth external surface, respectively. When the first tooth and the first recess have their respective widthwise centers matched, the first external surface has a distance to the first internal surface larger than the third external surface does to the third internal surface, and the second external surface has a distance to the second internal surface larger than the fourth external surface does to the fourth internal surface.

Preferably, the fitting structure further includes a sun gear, a ring gear provided radially outer than the sun gear, and a pinion gear disposed between the sun gear and the ring gear and meshing with the sun gear and the ring gear. The power transmission member is adapted to be a carrier holding the pinion gear rotatably and the fitting member is adapted to be a gear casing.

Preferably, the fitting structure further includes a counter gear meshing with the ring gear, and the first tooth is more adjacent to the counter gear than the second tooth is. Preferably, the buffer member is annularly formed and attached to the first tooth.

Note that the above features may be combined as appropriate.

Effects of the Invention

The present fitting structure can thus reduce usual noise caused between a power transmission member and a fitting member.

DESCRIPTION OF THE REFERENCE SIGNS teeth 161, 162, recesses 163, 164, planetary carrier 323, accommodation recess 600*a*, casing 600.

BEST MODES FOR CARRYING OUT THE INVENTION

With reference to FIG. 1 to FIG. 12, the present invention provides a fitting structure for a planetary gear mechanism and a gear casing, as will be described hereinafter. It should be noted that in the following embodiment(s) when numbers, amounts and the like are referred to, the present invention is not necessarily limited thereto in scope unless otherwise indicated. Furthermore, in the following embodiment(s), each component is not necessarily essential to the present invention unless otherwise indicated.

Figure 1:
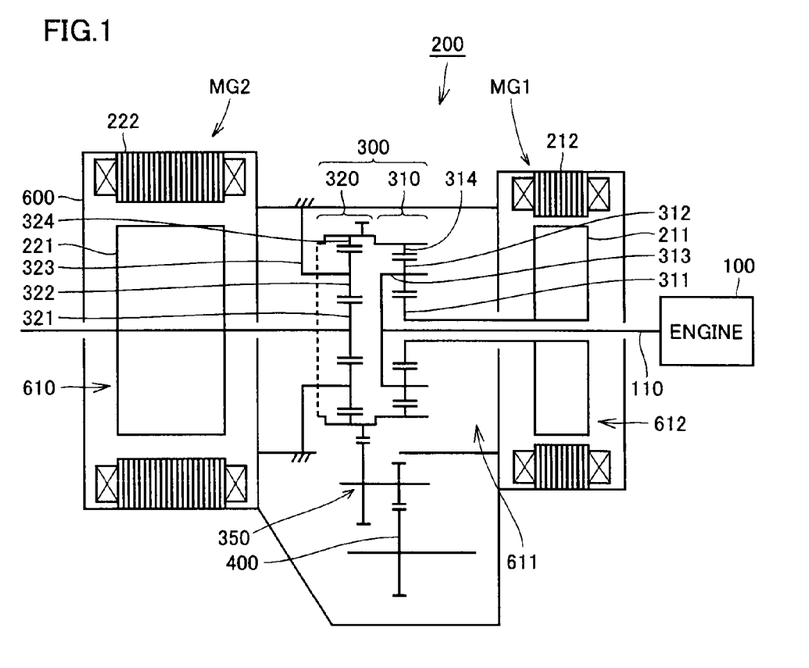
FIG. 1 schematically shows a configuration of a hybrid vehicle having a fitting structure applied thereto according to one embodiment of the present invention.

FIG. 1 schematically shows a configuration of a hybrid vehicle having a fitting structure applied thereto according to one embodiment of the present invention.

With reference to FIG. 1, the hybrid vehicle includes a drive device 200 rotating a driving wheel, and drive device 200 includes an engine 100, motor generators MG1, MG2, a power split device (or power transmission mechanism) 300, a differential mechanism 400, and a casing 600. Casing 600 has formed therein an accommodation chamber 610 having motor generator MG2 accommodated therein, an accommodation chamber 611 having power split device 300 accommodated therein, and an accommodation chamber 612 having motor generator MG1 accommodated therein.

Motor generators MG1, MG2 are configured including rotors 211, 221 and stators 212, 222, respectively.

Power split device 300 is configured including planetary gears 310, 320. Planetary gears 310, 320 are configured including sun gears 311, 321, pinion gears 312, 322, planetary carriers 313, 323, and ring gears 314, 324, respectively.

Engine 100, motor generator MG1 and motor generator MG2 have a crankshaft 110, rotor 211 and rotor 221, respectively, rotated around a single axial line.

Planetary gear 310 has sun gear 311 coupled with a hollowed sun gear shaft having an axial center penetrated by crankshaft 110. Ring gear 314 is supported to be rotatable coaxially with crankshaft 110. Pinion gear 312 is disposed between sun gear 311 and ring gear 314, and while pinion gear 312 rotates, it also revolves around sun gear 311. Planetary carrier 313 is coupled with an end of crankshaft 110 and supports the rotation shaft of each pinion gear 312.

A counter driver gear used for extracting power from power split device 300 rotates with ring gear 314. The counter drive gear is connected to a counter gear 350. Power transmission is performed between the counter drive gear and counter gear 350. Counter gear 350 drives differential mechanism 400. In going downhill or the like, a vehicular wheel's rotation is transmitted to differential mechanism 400, and counter gear 350 is driven by differential mechanism 400.

Motor generator MG1 mainly operates as an electric power generator generating electromotive force at the opposite ends of a 3-phase coil by an interaction of a magnetic field provided by a permanent magnet and the rotation of rotor 211.

Motor generator MG2 has rotor 221 coupled via a speed reducer, or planetary gear 320, with a ring gear casing rotating with the planetary gear 310 ring gear 314.

Motor generator MG2 operates as an electric motor rotating and thus driving rotor 221 by an interaction of a magnetic field generated by a permanent magnet embedded in rotor 221 and a magnetic field formed by a 3-phase coil wound on stator 222. Furthermore, motor generator MG2 also operates as an electric power generator generating electromotive force at the opposite ends of a 3-phase coil by an interaction of a magnetic field provided by a permanent magnet and the rotation of rotor 221.

Figure 2:
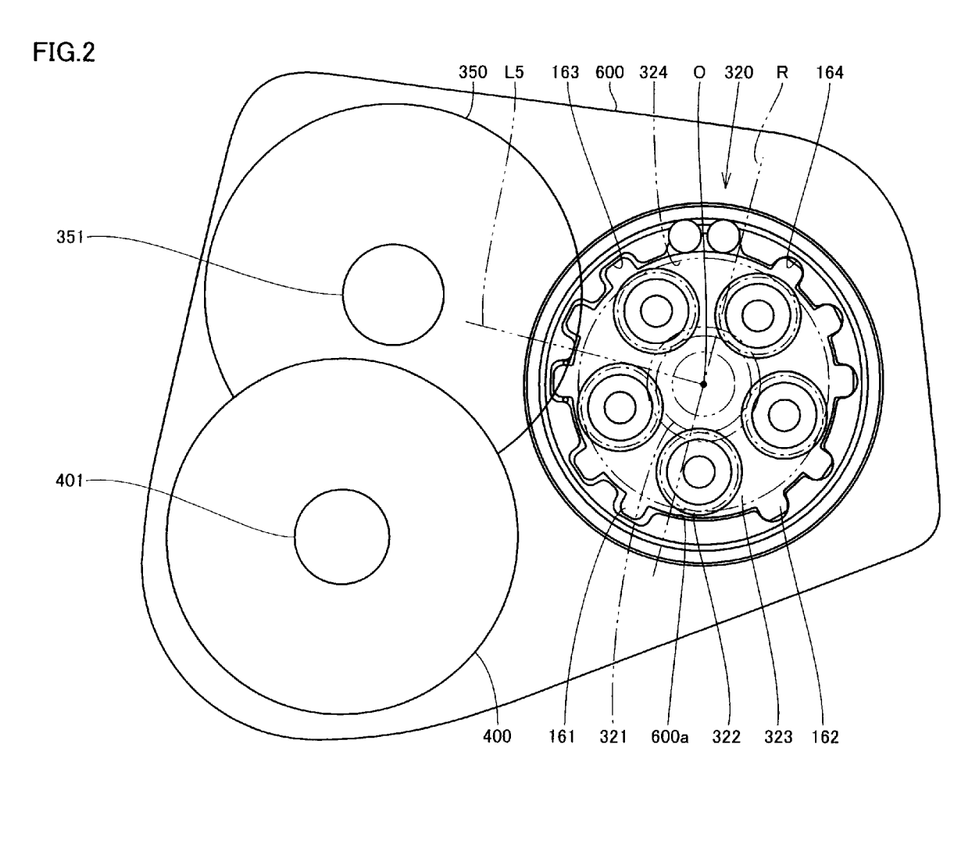
FIG. 2 is a cross section of a casing 600 as seen at an engine.

FIG. 2 is a cross section of casing 600 as seen at the engine.

In FIG. 1 and FIG. 2, planetary gear 320 performs deceleration by a structure having one rotary element, i.e., planetary carrier 323, secured to a casing of a vehicular drive device. More specifically, planetary gear 320 includes sun gear 321 coupled with a shaft of rotor 221, ring gear 324 rotating with ring gear 314, and pinion gear 322 meshing with ring gear 324 and sun gear 321 and transmitting the rotation of sun gear 321 to ring gear 324.

Planetary carrier 323 holds a plurality of spaced pinion gears 322 rotatably and pinion gear 322 applies a torque to planetary carrier 323 in its circumferential direction. Planetary carrier 323 is fitted in casing 600 and is substantially not rotated.

In casing 600, a counter shaft 351 provided with counter gear 350 and a shaft 401 connected to a vehicular wheel are provided, and counter gear 350 and ring gear 324 mesh.

Planetary carrier 323 is annular and has an outer circumferential edge with a plurality of spaced teeth 161, 162. Each tooth 161, 162 is formed to project from the outer circumferential edge of planetary carrier 323 radially outward.

Casing 600 is provided with an accommodation recess 600*a* receiving planetary carrier 323 and also securing planetary carrier 323. Note that accommodation recess 600*a* is provided with a hole receiving the rotation shaft of motor generator MG2. Accommodation recess 600*a* has an internal, circumferential surface having a recess 163 receiving tooth 161 of planetary carrier 323 and a recess 164 receiving tooth 162 of planetary carrier 323, and accommodation recess 600*a* has the internal, circumferential surface formed to surround the outer circumferential edge of planetary carrier 323.

Planetary carrier 323 has teeth 161, 162 fitted into recesses 163, 164 so that planetary carrier (or power transmission member) 323 and casing (or fitting member) 600 fit each other in the circumferential direction of planetary carrier 323 to configure a fitting structure according to the present embodiment.

Tooth 161 is formed on the planetary carrier 323 outer circumferential surface at a position closer to counter shaft 351 and counter gear 350 than a centerline of rotation O of planetary gear 320. In contrast, tooth 162 is formed on the planetary carrier 323 outer circumferential surface at a side opposite to that having tooth 161 with the centerline of rotation O interposed.

A virtual centerline extending across an engagement of counter gear 350 and ring gear 324 and the centerline of rotation O of planetary gear 320 will be represented as a virtual centerline L5 and a virtual plane extending across the centerline of rotation O and orthogonal to virtual centerline L5 will be represented as a virtual plane R hereinafter.

Recess 163 and tooth 161 are closer to counter shaft 351 than virtual plane R and tooth 162 and recess 164 are opposite to counter shaft 351 with virtual plane R interposed.

Accordingly, tooth 161 is more adjacent to counter gear 350 and counter shaft 351 than tooth 162.

Figure 3:
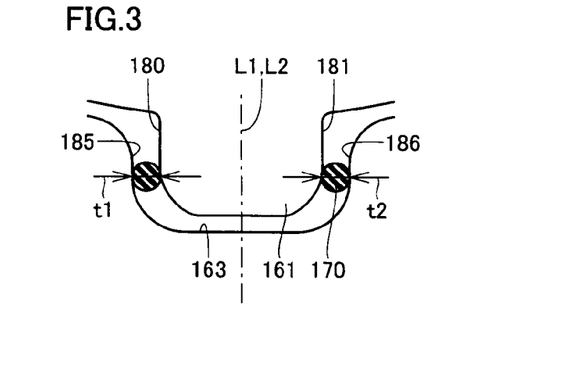
FIG. 3 is a plan view of a tooth 161 and a recess 163 in a partial cross section.
Figure 4:
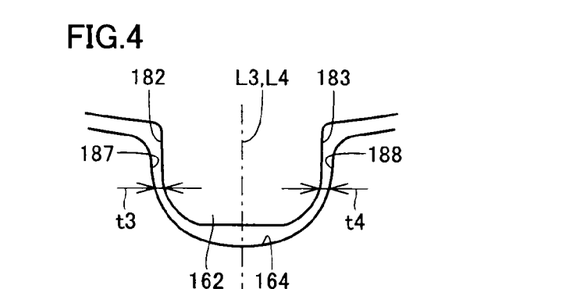
FIG. 4 is a plan view of a tooth 162 and a recess 164 in a partial cross section.

FIG. 3 is a plan view of tooth 161 and recess 163 in a partial cross section and FIG. 4 is a plan view of tooth 162 and recess 164 in a partial cross section.

As shown in FIG. 3, tooth 161 has an external, circumferential surface including external surfaces 180, 181 in a widthwise direction of tooth 161 (i.e., in the circumferential direction of planetary carrier 323), and recess 163 has an internal, circumferential surface including an internal surface 185 facing external surface 180 and an internal surface 186 facing external surface 181.

Furthermore, as shown in FIG. 4, tooth 162 has an external, circumferential surface including external surfaces 182, 183 in a widthwise direction of tooth 162 (i.e., in the circumferential direction of planetary carrier 323), and recess 164 has an internal, circumferential surface including an internal surface 187 facing external surface 182 and an internal surface 188 facing external surface 183.

In the FIG. 3 state, planetary carrier 323 does not receive torque, and a virtual centerline L1 extending across a widthwise center of tooth 161 and the centerline of rotation O and a virtual centerline L2 extending across a widthwise center of recess 163 and the centerline of rotation O match. At the time, in FIG. 4, a virtual centerline L3 extending across a widthwise center of tooth 162 and the centerline of rotation O and a virtual centerline L4 extending across a widthwise center of recess 164 and the centerline of rotation O match.

With teeth 161, 162 and recesses 163, 164 having their respective widthwise centers matched in the circumferential direction of planetary carrier 323, the tooth 161 external surface 180 and the recess 163 internal surface 185 have a distance t1 therebetween as seen in the circumferential direction of planetary carrier 323. More specifically, distance t1 is a distance, as seen in the circumferential direction of planetary carrier 323, between a portion of the tooth 161 external surface 180 that abuts against internal surface 185 as planetary carrier 323 rotates and a portion of internal surface 185 that abuts against external surface 180 as planetary carrier 323 rotates.

Similarly, external surface 181 and internal surface 186 have a distance t2 therebetween, external surface 182 and internal surface 187 have a distance t3 therebetween, and external surface 183 and internal surface 188 have a distance t4 therebetween. When distances t1 to t4 are thus set, distance t1 is larger than distance t3 and distance t2 is larger than distance t4.

In the present embodiment, distance t1 and distance t2 are equal and distance t3 and distance t4 are equal. Furthermore, distance t1 is only required to be larger than distance t3 and distance t2 is only required to be larger than distance t4, and recesses 163, 164 and teeth 161, 162 have their widths set as appropriate.

As shown in FIG. 3, tooth 161 has an external, circumferential surface with an annular buffer member 170 attached thereto. In the FIG. 3 example, buffer member 170 is an O ring or a similar annular resin member and may be any elastically deformable member.

As shown in FIG. 3, when planetary carrier 323 does not receive power, buffer member 170 has an outer surface abutting against both internal surface 185 and internal surface 186. Furthermore, buffer member 170 has an inner surface abutting against external surface 180 and external surface 181.

Thus when planetary carrier 323 does not receive external force, buffer member 170 allows tooth 161 and recess 163 to have their respective widthwise centers matched in the circumferential direction of planetary carrier 323. This allows tooth 162 and recess 164 to have their respective widthwise centers matched in the circumferential direction of planetary carrier 323 and the tooth 162 external surfaces 182, 183 and the recess 164 internal surfaces 187, 188 are spaced.

For example, when a vehicle is idle or gradually accelerated, planetary gear 320 is driven and pinion gear 322 applies power of small torque to planetary carrier 323. When small torque is applied to planetary carrier 323, planetary carrier 323 slightly rotates. Accordingly, the spacing between external surface 180 and internal surface 185 or that between external surface 181 and internal surface 186 as shown in FIG. 3 is decreased and buffer member 170 is elastically deformed. Buffer member 170 thus deformed supports planetary carrier 323 against the torque applied to planetary carrier 323. On the other hand, external surfaces 182, 183 and internal surfaces 187, 188 are held spaced, and are thus prevented from collision.

As external surfaces 182, 183 and internal surfaces 187, 188 are prevented from collision, noise vibration and the like can be reduced/prevented that are caused as tooth 162 collides against an internal, circumferential surface of recess 164 when the vehicle is idle or gradually accelerated or the like with the engine providing a slightly varying torque.

Figure 5:
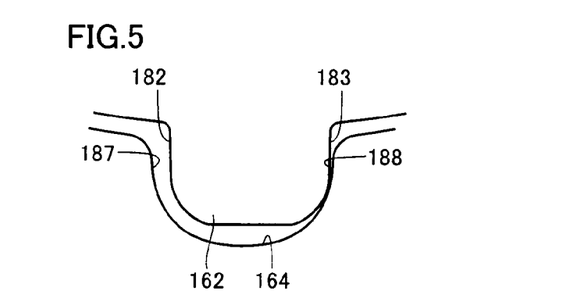
FIG. 5 is a plan view of tooth 162 and recess 164 as seen when a planetary carrier 323 receives power of large torque.
Figure 6:
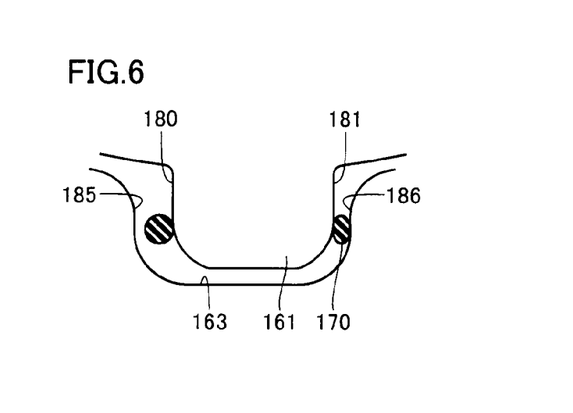
FIG. 6 is a plan view of tooth 161 and recess 163 in the FIG. 5 state.

FIG. 5 is a plan view of tooth 162 and recess 164 as seen when planetary carrier 323 receives power of large torque and FIG. 6 is a plan view of tooth 161 and recess 163 in the FIG. 5 state.

As shown in FIG. 5, when the vehicle is suddenly driven off, rapidly accelerated, or the like, the tooth 162 external surface 183 abuts against the recess 164 internal surface 188. Herein, as shown in FIG. 3 and FIG. 4, when planetary carrier 323 does not receive external force, distance t4 between external surface 183 and internal surface 188 is smaller than distance t2 between external surface 181 and internal surface 186, and accordingly, as shown in FIG. 5, while external surface 183 abuts against internal surface 188, external surface 181 is spaced from internal surface 186. Buffer member 170 elastically deforms as external surface 181 is adjacent to internal surface 186.

Thus, when planetary carrier 323 receives large torque, tooth 162 abuts against an internal, circumferential surface of recess 164 to support the torque applied to planetary carrier 323.

Furthermore, as the tooth 162 external surface 183 abuts against the recess 164 internal surface 188, the tooth 161 external surface 181 is held spaced from the recess 163 internal surface 186, and buffer member 170 is prevented from receiving excessive load. This protects buffer member 170 from damage.

Figure 7:
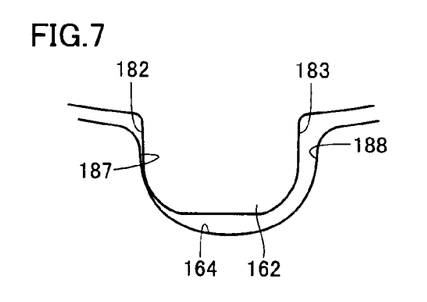
FIG. 7 is a plan view of tooth 162 and recess 164 in rapid deceleration.
Figure 8:
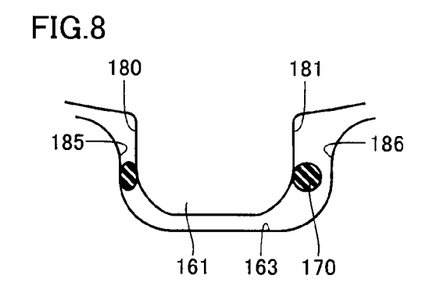
FIG. 8 is a plan view of tooth 161 and recess 163 in the FIG. 7 state.

FIG. 7 is a plan view of tooth 162 and recess 164 in rapid deceleration and FIG. 8 is a plan view of tooth 161 and recess 163 in the FIG. 7 state. As shown in FIG. 7, in rapid deceleration, the tooth 162 external surface 182 abuts against the recess 164 internal surface 187. At the time, as shown in FIG. 8, the tooth 161 external surface 180 is adjacent to the recess 163 internal surface 185, while external surface 180 is held spaced from internal surface 185. Buffer member 170 is thus prevented from fracture.

Thus, in planetary gear 320 of the present embodiment, a noise can be reduced that is caused as a tooth collides against casing 600 when planetary carrier 323 receives a varying torque.

Figure 9:
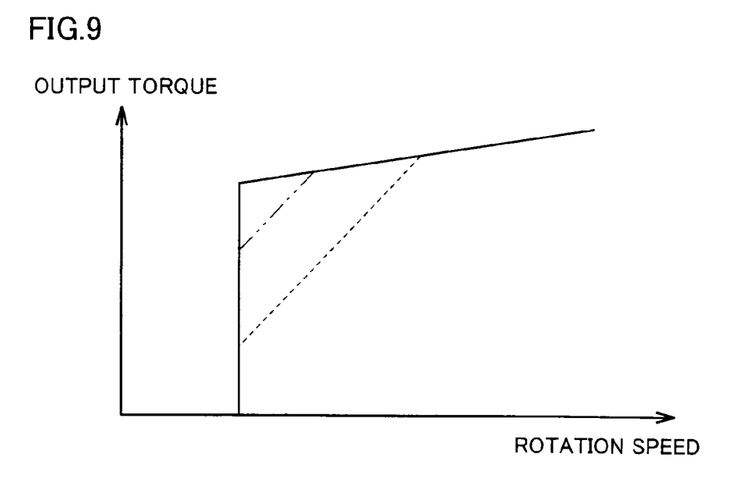
FIG. 9 is a graph representing a relationship between an engine's output torque and rotation speed.

Planetary carrier 323 thus no longer causing large noise allows increased output torque in low rotation. FIG. 9 is a graph representing a relationship between an engine's output torque and rotation speed. The FIG. 9 graph indicates a solid line, which indicates a relationship between output torque and rotation speed that is efficient for the engine. Furthermore, the graph shows a chain double-dashed line, which indicates a relationship that drive device 200 has between its output torque and its rotation speed according to the present embodiment, and a broken line, which indicates a relationship that a conventional drive device has between its output torque and its rotation speed. Note that FIG. 9 shows a relationship between output torque and rotation speed, that is provided when a noise from the drive device according to the present embodiment and that from the conventional drive device are matched.

As shown in FIG. 9, it can be seen that when the caused noises are matched, drive device 200 of the present embodiment can drive the engine more efficiently than the conventional drive device.

In FIG. 2, recess 164 is provided on the internal, circumferential surface of accommodation recess 600a at a region opposite to an engagement of counter gear 350 and ring gear 324 with virtual plane R interposed.

Recess 164 receives a large load from tooth 162, and accordingly, casing 600 at recess 164 is increased in stiffness to be larger in stiffness than casing 600 at recess 163.

More specifically, casing 600 at recess 164 is larger in thickness than casing 600 at recess 163. The region in which recess 164 is located is closer to an outer peripheral side of casing 600, and while casing 600 at recess 164 is formed to be large in thickness, there is no fear that it may interfere with another member.

Figure 10:
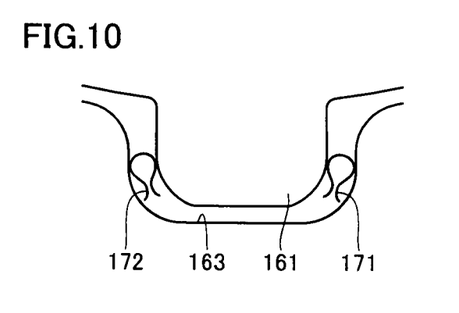
FIG. 10 is a plan view of a buffer member 170 in a first exemplary variation.

FIG. 10 is a plan view of buffer member 170 in a first exemplary variation. As shown in FIG. 10, a metallic spring or similar buffer member 171, 172 may be used.

Figure 11:
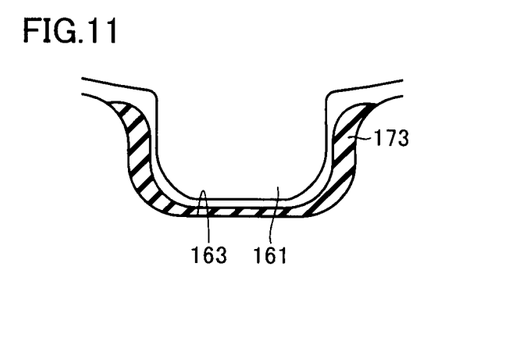
FIG. 11 is a cross section of buffer member 170 in a second exemplary variation.

FIG. 11 is a cross section of buffer member 170 in a second exemplary variation, and it shows a buffer member 173 attached to an internal surface of recess 163. When tooth 161 and recess 163 have their respective widthwise centers matched in the circumferential direction of planetary carrier 323, external surfaces 180, 181 have a smaller distance to an internal, circumferential surface of buffer member 173 than distances t3, t4 shown in FIG. 4.

Accordingly, if the engine transmits a varying torque to planetary gear 320, tooth 161 contacts buffer member 173 before tooth 162 contacts an internal surface of recess 164. Thus, despite the varying torque, unusual noise can be minimized/prevented.

Figure 12:
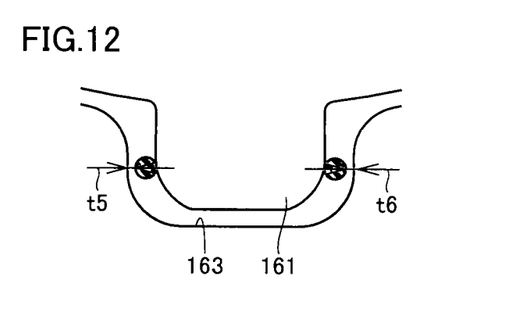
FIG. 12 is a front view of buffer member 170 in a third exemplary variation.

FIG. 12 is a front view of buffer member 170 in a third exemplary variation. In the FIG. 12 example when tooth 161 and recess 163 have their respective widthwise centers matched in the circumferential direction of planetary carrier 323, buffer member 170 has an outer circumferential surface spaced from the recess 163 internal surfaces 185, 186.

More specifically, the recess 163 internal surface 185 has a distance t5 to buffer member 170 smaller than distance t3 shown in FIG. 4, and furthermore, the recess 163 internal surface 186 has a distance t6 to buffer member 170 smaller than distance t4 shown in FIG. 4.

Accordingly, in the FIG. 12 example also, if the engine transmits a varying torque to planetary gear 320, tooth 161 contacts buffer member 170 before tooth 162 contacts an internal surface of recess 164.

Note that while the FIG. 1 to FIG. 12 example has been described for a plurality of teeth 161 and a plurality of recesses 163 with a single tooth 161 and a single recess 163 provided with a buffer member interposed, the present invention is not limited thereto. For example, a plurality of teeth 161 may have buffer member 170 attached thereto.

Note that while the FIG. 1 to FIG. 12 example has been described for a fitting structure for a planetary gear mechanism's planetary carrier 323 and casing 600 with a fitting structure of the present invention applied thereto, the present invention is not limited to the fitting structure for planetary carrier 323 and casing 600.

For example, the present fitting structure is applicable in a vehicle including an engine, a clutch and a transmission to a spline coupling the transmission's input shaft and the clutch's output shaft together.

More specifically, the spline (or fitting structure) includes an input shaft of a transmission having a plurality of circumferential, spaced teeth, and a cylinder connected to a clutch's output shaft and capable of receiving the transmission's input shaft.

The cylinder has an internal, circumferential surface having a plurality of recesses (or grooves) capable of receiving the teeth formed on the input shaft's circumferential surface, and the input shaft has its teeth fitted into the grooves and the cylinder and the input shaft are thus fitted together circumferentially.

The input shaft is provided with tooth 161 as shown in FIG. 3 and tooth 162 as shown in FIG. 4.

Furthermore, the cylinder has an internal, circumferential surface having recess 163 as shown in FIG. 3 and recess 164 as shown in FIG. 4. If the present invention is applied to a spline, each recess 163, 164 extends along the clutch's output shaft. The input shaft has tooth 161 with buffer member 170 attached thereto.

The spline (or fitting structure) thus formed also allows an engine to output a varying torque without the cylinder and the input shaft having a tooth and a recess colliding and thus causing large noise.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a fitting structure configured of a power transmission member receiving power transmitted and a fitting member fitted to the power transmission member, and in particular a fitting structure of a planetary gear mechanism's planetary carrier and gear casing, a splined structure and the like.

The invention claimed is:

1. A fitting structure comprising:
a power transmission member circumferentially provided with first and second spaced teeth and receiving power transmitted;
a fitting member surrounding said power transmission member and having a first recess and a second recess receiving said first tooth and said second tooth therein, respectively, to fit to said power transmission member, an elastically deformable buffer member being provided between an external surface of said first tooth and an internal surface of said first recess, there being a larger distance between said external surface of said first tooth and said internal surface of said first recess than that between an external surface of said second tooth and an internal surface of said second recess; and
a sun gear, a ring gear provided radially outer than said sun gear, a pinion gear disposed between said sun gear and said ring gear and meshing with said sun gear and said ring gear, and a counter gear meshing with said ring gear, wherein:
said first tooth has said external surface including a first external surface and a second external surface aligned in a widthwise direction of said first tooth;
said second tooth has said external surface including a third external surface and a fourth external surface aligned in a widthwise direction of said second tooth;
said first recess has said internal surface including a first internal surface and a second internal surface, the first internal surface of the first recess facing said first external surface of said first tooth in the widthwise direction and the second internal surface of the first recess facing said second external surface of said first tooth in the widthwise direction;

said second recess has said internal surface including a third internal surface and a fourth internal surface, the third internal surface of the second recess facing said third external surface of the second tooth in the widthwise direction and the fourth internal surface of the second recess facing said fourth external surface of the second tooth in the widthwise direction;

when said first tooth and said first recess have their respective widthwise centers matched, said first external surface of said first tooth has a distance to said first internal surface of the first recess larger than said third external surface of said second tooth does to said third internal surface of the second recess, and said second external surface of said first tooth has a distance to said second internal surface of the first recess larger than said fourth external surface of said second tooth does to said fourth internal surface of the second recess; and said first tooth is more adjacent to said counter gear than said second tooth is.

2. The fitting structure according to claim 1, wherein said power transmission member is adapted to be a carrier holding said pinion gear rotatably and said fitting member is adapted to be a gear casing.

3. The fitting structure according to claim 1, wherein said buffer member is annularly formed and attached to said first tooth.

4. The fitting structure according to claim 1, wherein when said first tooth and said first recess have their respective widthwise centers matched, the power transmission member and the fitting member have a center of rotation and a center, respectively, matched.

5. The fitting structure according to claim 1, wherein the buffer member is provided between the first external surface and the first internal surface and between the second external surface and the second internal surface.

* * * * *